(12) United States Patent
Harshman

(10) Patent No.: US 8,151,516 B1
(45) Date of Patent: Apr. 10, 2012

(54) FLORAL DISPLAYS

(75) Inventor: Trent Harshman, Galveston, IN (US)

(73) Assignee: Syndicate Sales, Inc., Kokomo, IN (US)

( * ) Notice: Subject to any disclaimer, the term of this patent is extended or adjusted under 35 U.S.C. 154(b) by 0 days.

(21) Appl. No.: 12/948,885

(22) Filed: Nov. 18, 2010

(51) Int. Cl.
*A01G 5/00* (2006.01)

(52) U.S. Cl. .................................. 47/41.01

(58) Field of Classification Search ........ 47/41.01, 47/41.1, 63, 65.9, 66.1, 78
See application file for complete search history.

(56) References Cited

U.S. PATENT DOCUMENTS

| 183,611 | A | | 10/1876 | Westcott |
| 274,006 | A | | 3/1883 | Kuehn |
| 600,313 | A | | 3/1898 | John |
| 2,121,173 | A | * | 6/1938 | MacPherson ............... 47/33 |
| 2,637,143 | A | * | 5/1953 | Reynolds et al. ........... 47/41.13 |
| 2,891,345 | A | * | 6/1959 | Uhlen ........................ 43/43.13 |
| 3,651,601 | A | | 3/1972 | Montagne |
| 3,962,825 | A | | 6/1976 | O'Connell |
| 4,004,367 | A | | 1/1977 | O'Connell |
| 4,058,929 | A | | 11/1977 | O'Connell |
| 4,204,365 | A | * | 5/1980 | Hirvi .......................... 47/41.01 |
| D286,759 | S | | 11/1986 | Lundgren et al. |
| 5,414,957 | A | | 5/1995 | Kenney |
| 5,454,189 | A | | 10/1995 | Graham |
| 5,588,253 | A | * | 12/1996 | Boodley et al. ............. 47/41.12 |
| 5,693,380 | A | | 12/1997 | O'Connell |
| D399,782 | S | | 10/1998 | Ray |
| D402,230 | S | | 12/1998 | Schorr |
| D410,409 | S | | 6/1999 | Ray |
| D413,261 | S | | 8/1999 | Yerich |
| 5,943,820 | A | | 8/1999 | O'Connell |
| 6,055,769 | A | | 5/2000 | Ray |
| 6,098,337 | A | * | 8/2000 | Chen et al. ................ 47/62 A |
| D431,205 | S | | 9/2000 | Hudson et al. |
| 6,145,245 | A | * | 11/2000 | Honkawa et al. ......... 47/41.01 |
| D446,157 | S | | 8/2001 | Glenn |
| 6,289,631 | B1 | | 9/2001 | Harshman et al. |
| 6,393,762 | B1 | | 5/2002 | Harshman |
| 6,688,040 | B1 | * | 2/2004 | Yang ........................ 47/41.1 |
| D555,535 | S | | 11/2007 | Mantor |
| 7,310,910 | B2 | * | 12/2007 | Miller et al. .............. 47/41.12 |
| 2005/0005513 | A1 | | 1/2005 | Walton |

FOREIGN PATENT DOCUMENTS

| EP | 304548 A1 * | 3/1989 |
| FR | 2620591 | 3/1989 |
| GB | 1544630 | 4/1979 |
| JP | 60123622 A * | 7/1985 |

* cited by examiner

*Primary Examiner* — Frank T Palo
(74) *Attorney, Agent, or Firm* — Woodard Emhardt Moriarty McNett & Henry LLP

(57) ABSTRACT

Methods and apparatus for floral displays. In some embodiments the floral displays include interlocking features that couple a cage structure to a base. These interlocking features help retain blocks of water-retaining foam in between the cage and the base. Some embodiments further include attachment tabs around the outer periphery of the display that further hold the cage and base together.

27 Claims, 19 Drawing Sheets

FLORAL DISPLAYS

FIELD OF THE INVENTION

The present invention pertains to methods and apparatus for securing floral displays, and in particular to methods and apparatus for keeping heavy displays in tact.

BACKGROUND OF THE INVENTION

One popular type of floral display includes water-retaining media, such as foam blocks, into which live flowers can be inserted. Water within the blocks helps maintain the life of the flowers.

The popularity of such displays has resulted in a demand for larger displays, as well as for displays that have large closed shapes, such as solid hearts. A solid heart can be more desirable than an opened-shape heart, since the closed shape can hold substantially more water-retaining media, and therefore support more live flowers.

Typical floral displays include a base, water-retaining media, and a structure to attach the media to the base. Some designs use two dimensional struts that couple the media to the base, such as those shown in U.S. Pat. No. 4,058,929, or U.S. Pat. No. 5,943,820. Yet other designs use three dimensional cage structures, such as those shown in U.S. Pat. No. 6,688,040. In yet other designs paper mache is used to retain the assembled display together.

Currently existing attachment structures tend to be inadequate for larger shapes and also for closed shapes. The weight of the saturated media can be great enough that it separates the foam structure from the base. This is especially true in those situations in which the owner of the display would like to have the display oriented as vertically as possible, so as to show off the live flowers. In some cases, the foam separates from the base, with the subsequent loss of the display.

What are needed are methods and apparatus for improving the structure integrity of floral displays. Various embodiments of the inventions described herein do this in novel and unobvious ways.

SUMMARY OF THE INVENTION

Various aspects of the embodiments shown herein pertain to methods and apparatus for safely securing together a multipart floral display. Yet other aspects of other embodiments pertain to floral displays that include water-bearing media for supporting live flowers embedded in the media.

Another aspect of some embodiments of the present invention is a base for a floral display that is adapted and configured to have top and bottom features that permit a plurality of bases to the stacked with stability. As one example, some bases include upwardly projecting ridges that are received within a recess of a base stacked on top.

One aspect of the present invention pertains to an apparatus for displaying flowers. Some embodiments include a base having a bottom, a peripheral edge including a plurality of interlocking features, and a base including a post extending upward from the bottom. Other embodiments include a cage having a border including a plurality of second interlocking features, wherein each of the first interlocking features is adapted and configured to interlock with a corresponding different one of the second interlocking features. The cage includes a coupling feature for interconnecting with the post. Still further embodiments include solid media capable of retaining water and having a shape similar to the predetermined shape, the media being captured between the base and the cage when the edge and border are interlocked together.

Another aspect of the present invention pertains to an apparatus for displaying flowers. Some embodiments include a base having a bottom and a peripheral edge in a predetermined shape, the edge including a plurality of first interlocking features, a first attachment tab extending outwardly from the edge. Other embodiments include a cage having a border in a shape similar to the predetermined shape, the border including a plurality of second interlocking features, wherein each of the first interlocking features is adapted and configured to interlock with a corresponding different one of the second interlocking features, a second attachment tab extending outwardly from the border. Yet other embodiments include solid media capable of retaining water and having a shape similar to the predetermined shape, the media being captured between the base and the cage when the edge and border are interlocked together, the first tab and said second tab substantially overlapping each other when the edge and border are interlocked together, the first tab and the second tab being adapted and configured to support the weight of the interlocked base and the cage when the media is captured and saturated with water.

Yet another aspect of the present invention pertains to an apparatus for displaying flowers that includes a base having a bottom with an upper surface and a lower surface and peripheral edge substantially surrounding the upper surface. The base includes at least one ridge extending from the edge on one side of the base across the upper surface to the edge on the opposite side of the base. The base includes at least one recess extending from edge to edge across the lower surface of the base. The recess and said ridge are adapted and configured such that the recess of one said base can be nested within a corresponding ridge of another the base when the one (top) base is aligned over and placed on top of the other (bottom) base. In some embodiments, the bottom base is not interlocked to a cage structure or contain water-retaining media.

It will be appreciated that the various apparatus and methods described in this summary section, as well as elsewhere in this application, can be expressed as a large number of different combinations and subcombinations. All such useful, novel, and inventive combinations and subcombinations are contemplated herein, it being recognized that the explicit expression of each of these combinations is unnecessary.

DESCRIPTION OF THE PREFERRED EMBODIMENT

Figure 1:
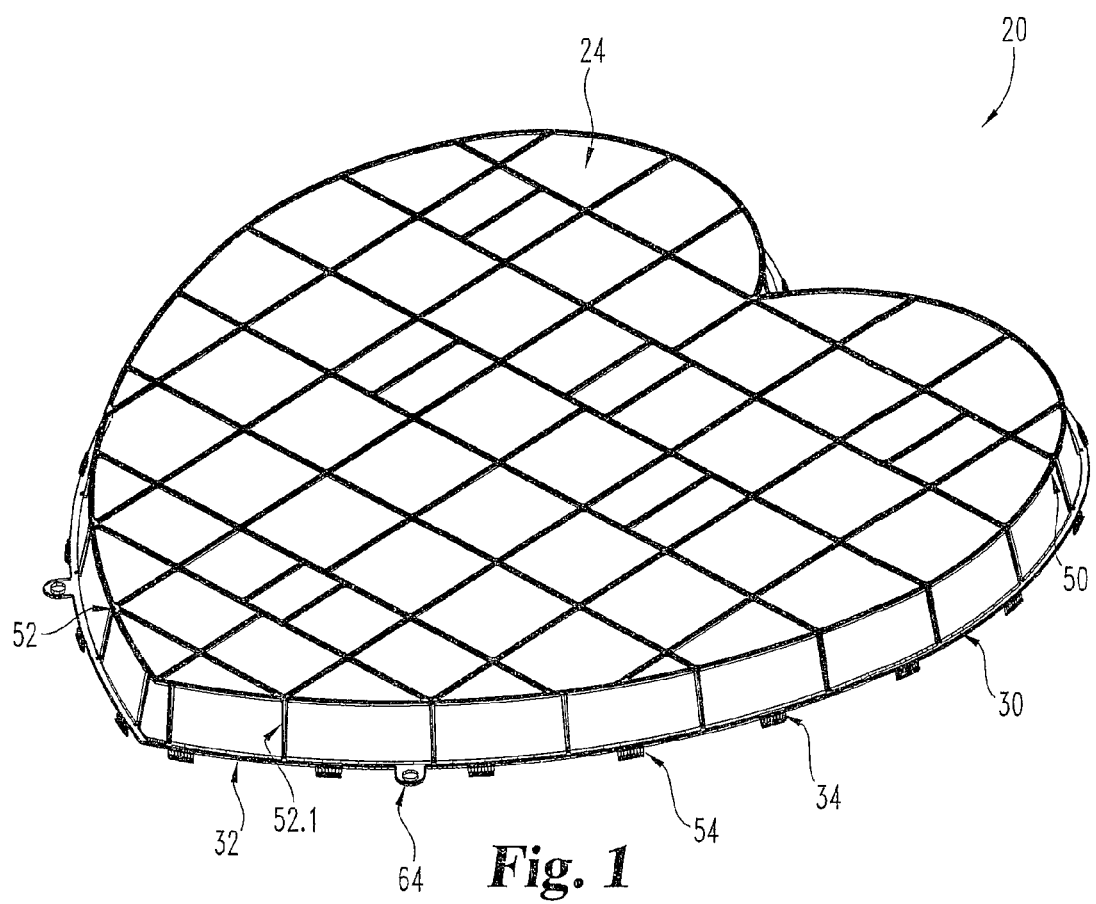
FIG. 1 is a front, bottom, left side perspective view of an assembled floral display according to one embodiment of the present invention.

For the purposes of promoting an understanding of the principles of the invention, reference will now be made to the embodiments illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates. At least one embodiment of the present invention will be described and shown, and this application may show and/or describe other embodiments of the present invention. It is understood that any reference to "the invention" is a reference to an embodiment of a family of inventions, with no single embodiment including an apparatus, process, or composition that should be included in all embodiments, unless otherwise stated.

The use of an N-series prefix for an element number (NXX.XX) refers to an element that is the same as the non-prefixed element (XX.XX), except as shown and described thereafter. As an example, an element 1020.1 would be the same as element 20.1, except for those different features of element 1020.1 shown and described. Further, common elements and common features of related elements are drawn in the same manner in different figures, and/or use the same symbology in different figures. As such, it is not necessary to describe the features of 1020.1 and 20.1 that are the same, since these common features are apparent to a person of ordinary skill in the related field of technology. Although various specific quantities (spatial dimensions, temperatures, pressures, times, force, resistance, current, voltage, concentrations, wavelengths, frequencies, heat transfer coefficients, dimensionless parameters, etc.) may be stated herein, such specific quantities are presented as examples only, and further, unless otherwise noted, are approximate values, and should be considered as if the word "about" prefaced each quantity. Further, with discussion pertaining to a specific composition of matter, that description is by example only, and does not limit the applicability of other species of that composition, nor does it limit the applicability of other compositions unrelated to the cited composition.

Some embodiments of the present invention described herein pertain to methods and apparatus for securing together a multi-piece floral display. The floral displays are typically in three parts: a base, a substantially open cage structure, and water-retaining foam. In some embodiments the cage structures have relatively slender members in their lattice work. This combination of an open lattice work with slender members allows for significant exposure of the water-retaining media, and therefore the ability to support a large number of live flowers.

However, it has been found that with larger displays, and also with displays that have a closed shape, that the thin cage structures used to capture the foam with only perimeter locks can be inadequate to support the substantial weight of the foam when it is saturated with water.

Some embodiments of the present invention include a plurality of interconnection features that couple the base to the cage structure at points within the interior of the floral shape. In some shapes, such as a closed heart, the interior foam blocks, when saturated with water, apply a loading to the cage structure that is at a peak toward the middle of the cage structure. By placing interconnection features toward the interior of the shape, it is possible to send a portion of these loads into the base directly, rather than trying to support those loads laterally at the peripheral border of the cage structure. It has also been found that by providing interior interconnection points, that the cage structure can be fabricated from inexpensive plastic materials, and can retain a slender, opened shape that is desirable in floral displays.

In some embodiments of the present invention there is a three dimensional cage structure that substantially encompasses the water-retaining media when the cage structure is interlocked with the base. By extending in three dimensions and encompassing the media in multiple directions, the stresses within the media are reduced, especially as compared to two dimensional clips that tend to locally overload the media. By encompassing the foam and reducing stresses in the media, there is less tendency for the foam to break apart. Further, if the foam does break apart, the three dimensional and encompassing nature of the cage will keep pieces of the foam from falling out of the display.

It has also been found that with larger displays, as well as displays having a shape that defines a closed interior, that it is desirable in some situations to mechanically couple the cage and base together at tab structures that can also be used for mechanically connecting the display to a supporting structure such as a backing board supported by an easel. In some situations, the user of the display would like to orient the floral display at near vertical angles. However, this orientation, especially when the water-retaining media is saturated, places additional load that attempts to both separate the cage from the base, and further to make the entire display marginally stable. Therefore, some embodiments of the present invention include attachment tabs extending both from the base, and from the cage, and which substantially overlap. The overlapped portion of the tabs includes a hole through which a fastener can be attached to hold the cage and base together and/or hold the case and base to a support structure.

Figure 2:
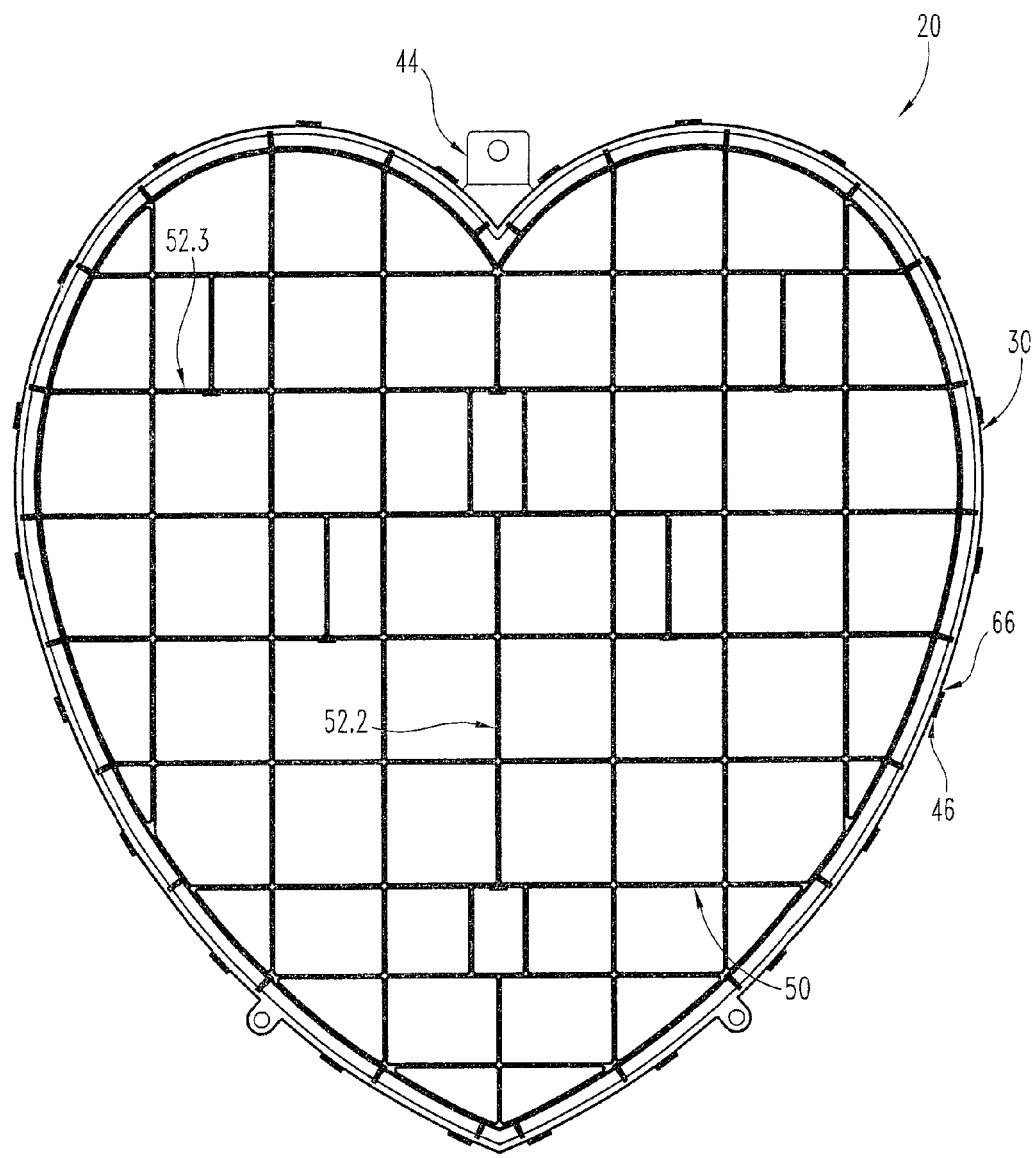
FIG. 2 is a top plan view of the display of FIG. 1.

FIGS. 1 and 2 show a floral display 20 in the shape of a heart. Display 20 includes a plurality of water-retaining media (such as foam blocks) captured between a cage structure 50 and a base 30. Base 30 includes a vertically projecting edge 34 that extends around the periphery of bottom 32 of base 30. A cage structure 50 comprises a substantially open mesh or lattice work 52 that extends across the span of the display, from top to bottom and side to side. Mesh 52 includes a lattice work of vertical retaining members 52.1, lateral members 52.3 (seen extending from right to left in FIG. 2) and additional lateral members 52.2 (seen extending laterally the heart shape in FIG. 2). The various members of this lattice work are interconnected, such as by being molded as an integral structure. The vertical members 52.1 couple the top arrangement of lattice members to a border 54 that preferable extends around the entire cage structure.

The border 54 of cage structure 50 preferably includes a plurality of attachment features 66. These attachment features 66 are adapted and configured to couple with a plurality of spaced apart attachment features 46 that are coupled to edge 34 of base 30. When cage 50 is placed upon base 30, the coupling features 46 and 66 interlock with each other such that the edge 34 and border 54 are interlocked together. As shown in FIGS. 1 and 2, cage 50 includes a plurality of male tabs 66 that extend within slots 46 of base 30. The male tabs 66 have a cross sectional shape of a stretched Z, and are fabricated from an elastic material, such that the bottom leg of the male tab can be pushed back to engage through slot 46, and after such engagement the tab 66 springs back out to prevent the tab from slipping out of the slot. Referring to FIG. 2, it can be seen that in one embodiment display 20 includes 22 tabs 66 and 22 slots 46 extending around the border and edge, respectively, for a display that is about 24 inches tall (still referring to FIG. 2) and about 21 inches wide at the greatest width. It is understood that FIGS. 2, 15, 16, and 17 include dimensions that are by way of example only. It is further understood that FIGS. 1, 2, 15, 16, and 17 are created from scaled drawings, but such scaling of features is by way of example only.

FIGS. 3, 4, 5, and 6 show a floral display 120 according to another embodiment of the present invention. Display 120 is in the overall shape of a solid heart, similar to that of display 20. A cage structure 150 and base 130 are each substantially similar heart shapes. Base 130 includes a vertically projecting (with respect to the orientation of FIG. 3) peripheral edge 34 that assists in retaining the water-retaining media (media not shown). The bottom 132 of base 130 has an interior 133 extending inward from the edge 134, the bottom 132 being subdivided into a plurality of compartments 140 by an array of ribs 136. These ribs 136 serve the function of stiffening the planar bottom 132, and further of creating small walls that project into the media and assist in holding the media in place.

Display 120 includes a plurality of tabs 166 and slots 146 that extend around the border 154 and edge 134, respectively. As is best seen in FIG. 4, display 120 includes 12 pairs of interlocking features 146 and 166.

Figure 3:
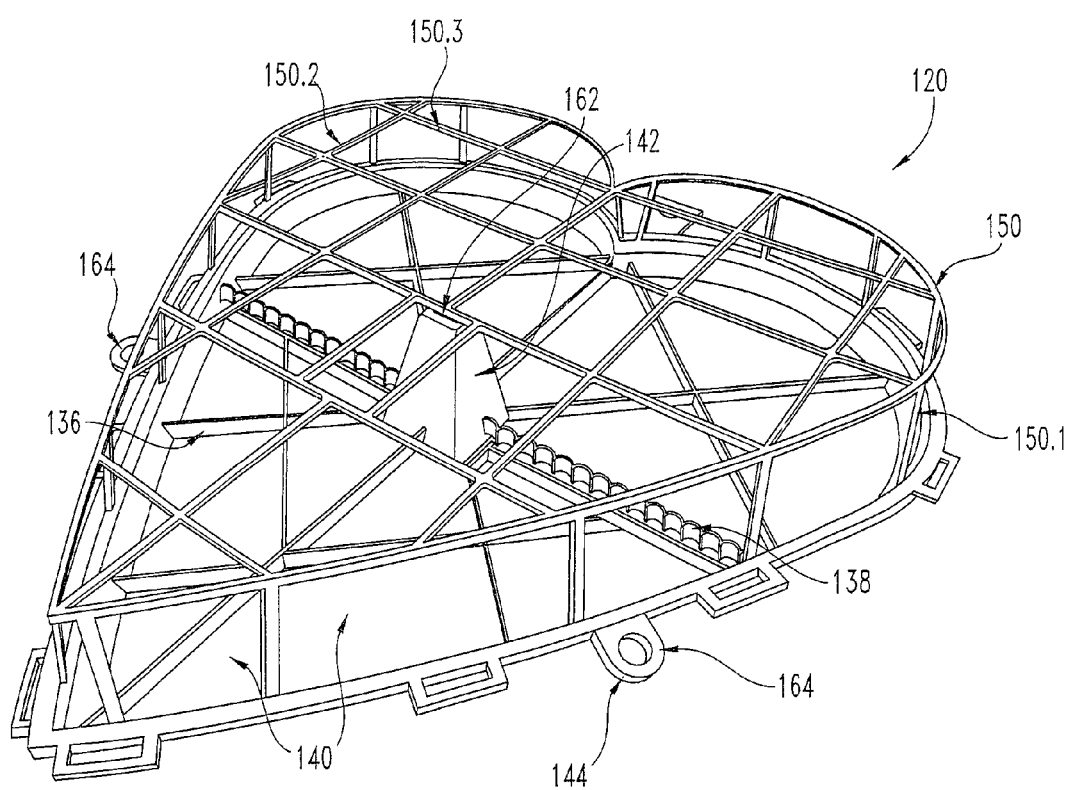
FIG. 3 is a front, bottom, left side perspective representation of an assembled cage and bottom of a floral display according to another embodiment of the present invention.

Floral display 120 further includes attachment tabs that assist both in holding the cage structure 150 to the base 130 and which also can be used to attach the display 120 to an underlying structure, such as a baseboard (not shown). Referring to FIGS. 3 and 4, it can be seen that base 30 includes 3 attachment tabs 144, one at the top of the heart shape, and one each on opposing edges. In addition, referring to FIG. 3, it can be seen that the side attachment tabs 144 align with substantially coincident attachment tabs 164 that extend from the border 154 of cage 150. Preferably, each pair of aligned tabs 144 and 164 defines substantially coincident holes through which a fastener can be placed. When so fastened, the attachment tabs on the opposing edges of display 120 hold both cage 150 to base 130, and further can hold display 120 onto a secondary structure. Referring to FIG. 4, the attachment tab 144 at the top of the heart shape extends only from base 130, although in some embodiments there is an accompanying tab extending from the top of the cage structure as well.

Floral display 120 includes means for attaching the interior of the cage structure to the interior of the base bottom. Referring first to FIGS. 3 and 4, it can be seen that display 120 includes an attachment post 142 molded into the interior 133 of bottom 132. Preferably, post 142 is placed centrally within the overall shape of the display, although other locations will be seen in embodiments discussed hereafter.

Figure 4:
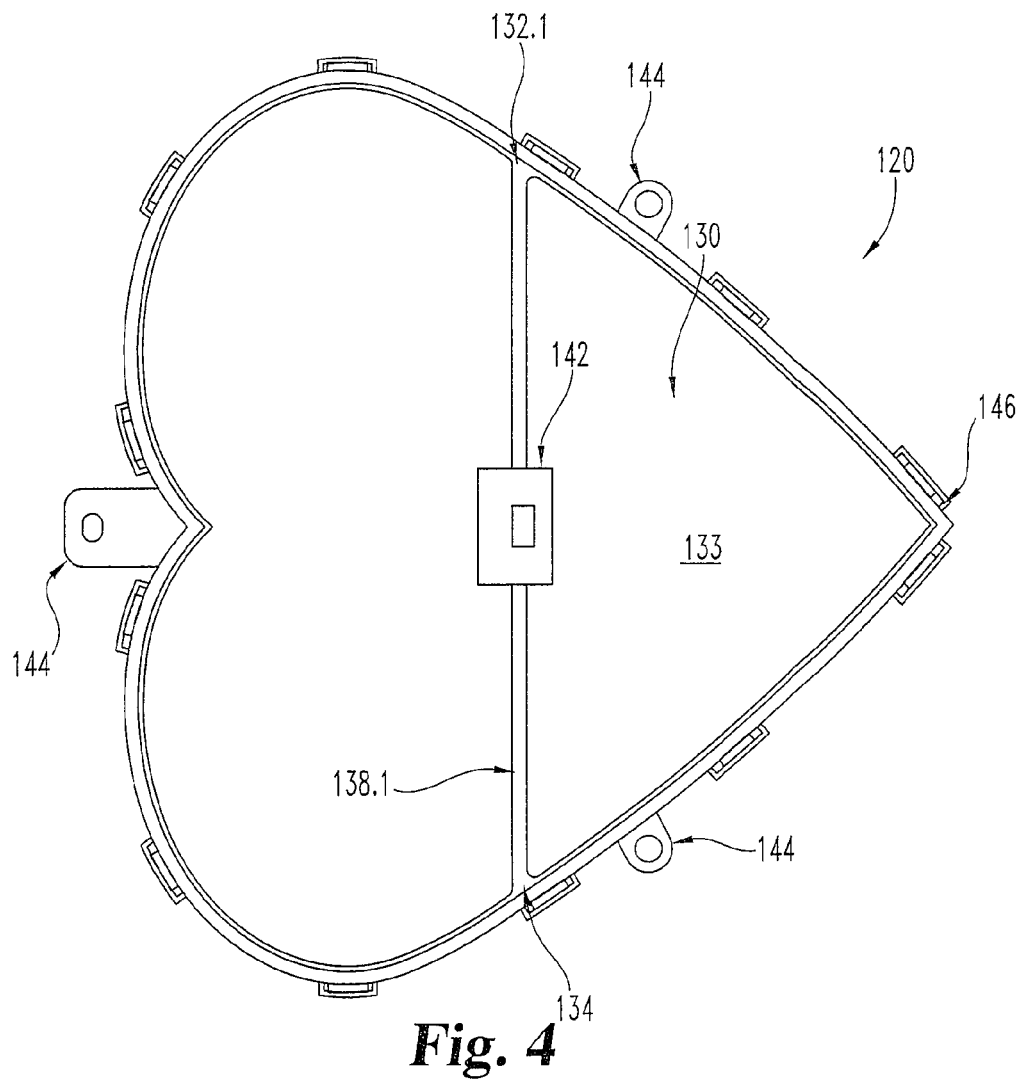
FIG. 4 is a rear plan view of the apparatus of FIG. 3.

As best seen in FIG. 4, post 142 is molded in a substantially hollow configuration. Preferably, this hollow shape is adapted and configured to receive within it the upwardly-projecting post shape shown in FIG. 3. In so doing, a plurality of bases 130 can be stacked, with the post of the lower base being received within the hollow of the upper base. In addition, FIG. 4 shows that ridge 138 is molded into base 130 such that a recess 132.1 extends across the bottom surface of bottom 132 from one peripheral edge 134 to another peripheral edge 134. This recess 132.1 is adapted and configured to receive within it a ridge 138 when a plurality of bases 130 (without cages or media) are stacked on one another.

Figure 5:
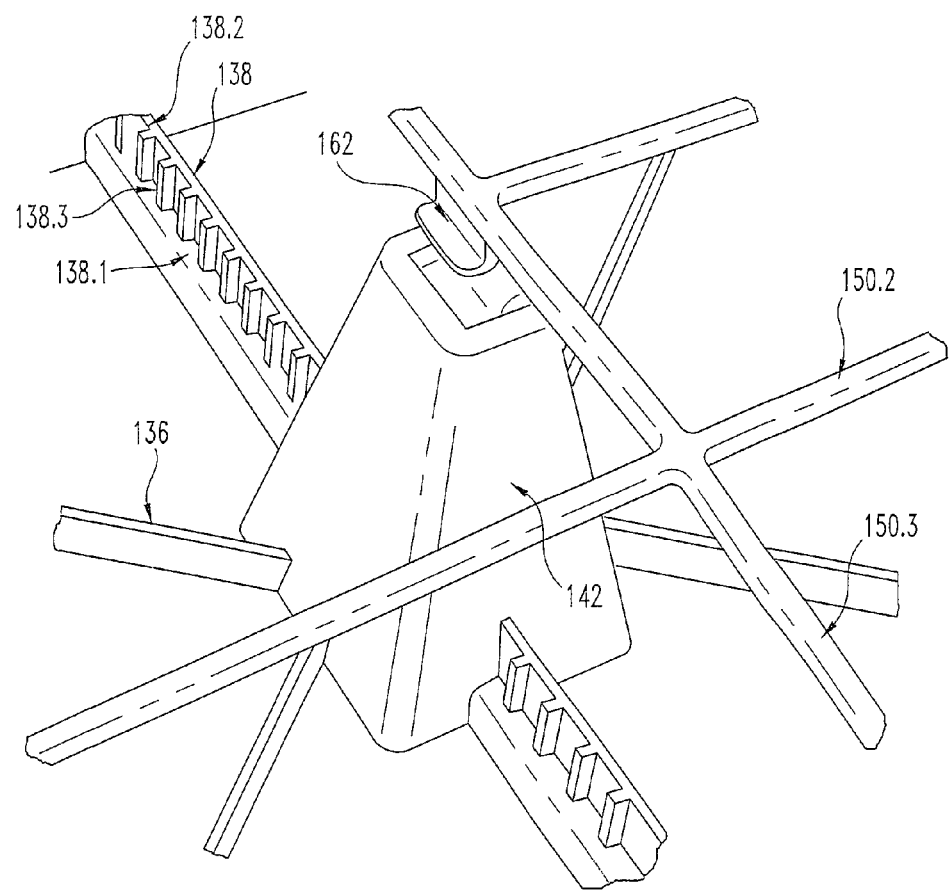
FIG. 5 is perspective representation of a portion of the apparatus of FIG. 3, with the cage and bottom not being interconnected.

As best seen in FIG. 4, in display 120 the attachment post 142 is integrally molded in a truncated pyramid shape (also as seen in FIG. 5) into bottom 132. Referring now to FIG. 5, it can be seen that cage structure 150 includes a male coupling 162 that is adapted and configured to snap into the top of attachment post 142. FIG. 5 shows that coupling feature 162 of the cage after being disconnected from post 142. It has been found that a floral display such as display 120 of a closed heart configuration gains substantial weight when the accompanying water-retaining media is saturated with water. In some cases the weight of the water is too great to be supported without significant deformation by a thin membered cage structure 150. By placing an attachment post within the interior of the overall shape, the loads from the saturated media can be passed into the base by the post 142, rather than being transferred laterally to the border 154.

The transfer of loads from the male coupling 162 into the attachment post 142 and subsequently into the bottom 132 is further addressed by a stiffening ridge 138. Stiffening ridge 138, as best seen in FIGS. 3 and 4 extends from one edge of base 30 to the opposing edge of base 130. Stiffening ridge 138 is adapted and configured to have a cross sectional moment of inertia that stiffens post 142 from being pulled vertically out of bottom 132. Further, the loads transmitted into post 142 are transmitted not just into bottom 132, but by way of ridge 138 to peripheral edges 134.

FIG. 5 presents a close-up view of post 142 and the network of stiffening ribs 136 and ridge 138. It can be seen that integrally molded stiffening ribs 136 extend into the wall structure of post 142. In addition, the more substantial stiffening ridge 136 extends into opposing sides of post 142. In some embodiments, ridge 138 has a three-part structure, including a broad base 138.1. A thinner and vertically extending wall 138.1 extends from base 138 and runs parallel to base 138.1. In addition, in order to resist any tendency of base 130 to want to fold along ridge 138, a plurality of stiffening posts 138.3 can be seen extending vertically from base 138.1 and along one surface of extension 138.2. These shorter ridges 138.3 help resist a tendency to bend base 130 along ridge 138 (referring to FIG. 4, bending in and out of the plane of the figure).

Figure 6:
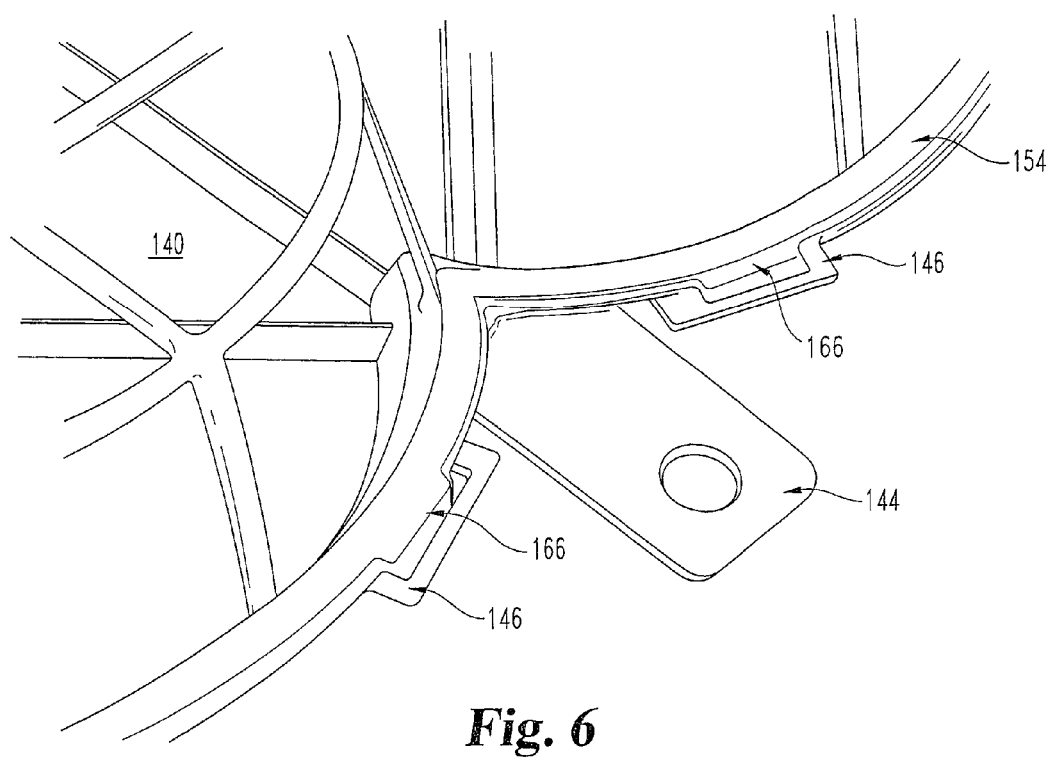
FIG. 6 is a perspective representation of a close-up of a portion of the apparatus of FIG. 3.

The edge 134 of bottom 132 extends generally around the bottom in the overall shape of the floral display, with a plurality of integrally molded attachment structures 146 extending laterally outwardly. As seen in FIG. 6, attachment structure 146 is an elongated slot. The border 154 of cage 150 likewise extends in the overall shape of the display, and includes a plurality of attachment features 166 that are complementary in function and shape to the attachment features 146. As shown in FIG. 6, the ridge 154 includes a plurality of male tabs that extend outwardly and downwardly, such that they can be snapped into the corresponding elongated slot. A small extension of male tab 166 extends under the outermost portion of the material defining slot 146. This outwardly protruding part of tab 166 (not shown in FIG. 6) can be bent inward (toward the interior of the base) for removal of tab 166 from slot 146.

Figure 7:
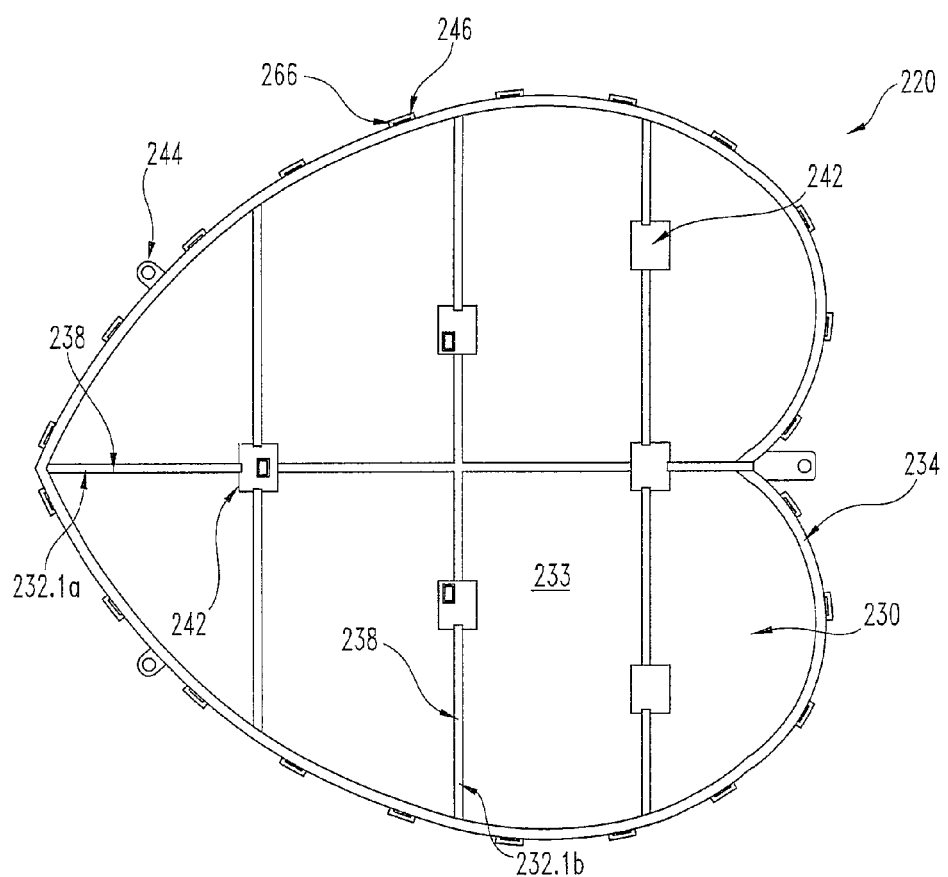
FIG. 7 is a rear plan view of a representation of a floral display according to another embodiment of the present invention.
Figure 8:
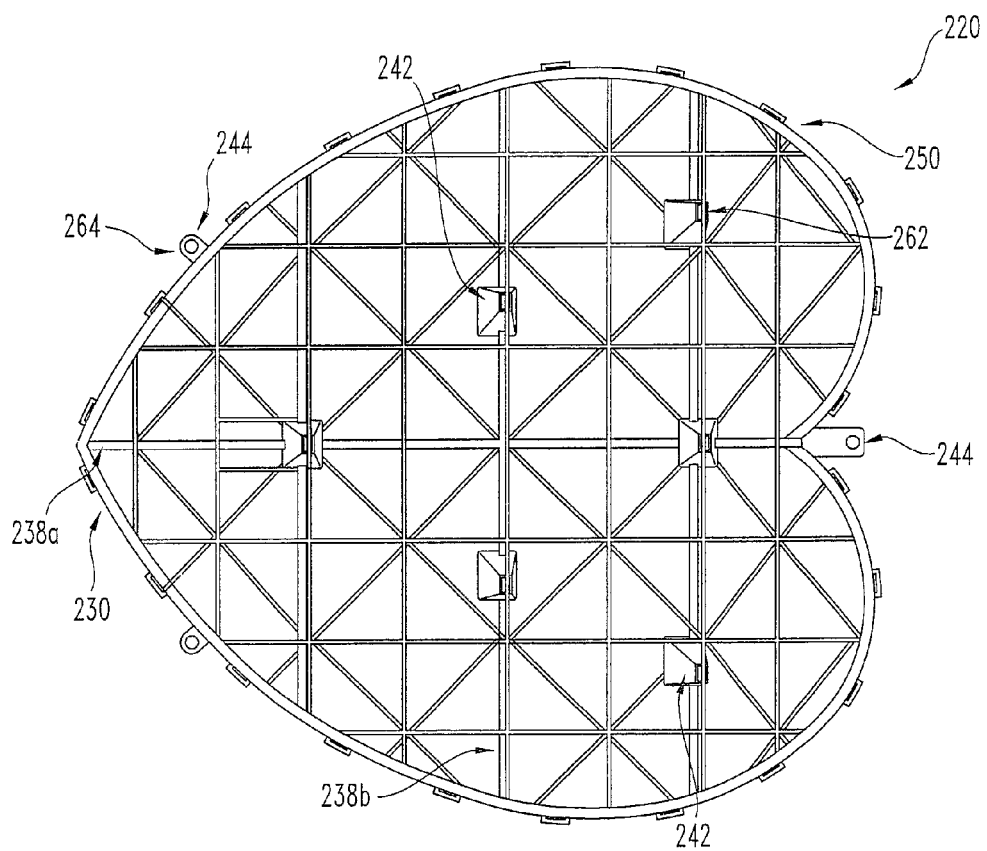
FIG. 8 is a front plan view of the apparatus of FIG. 7.
Figure 9:
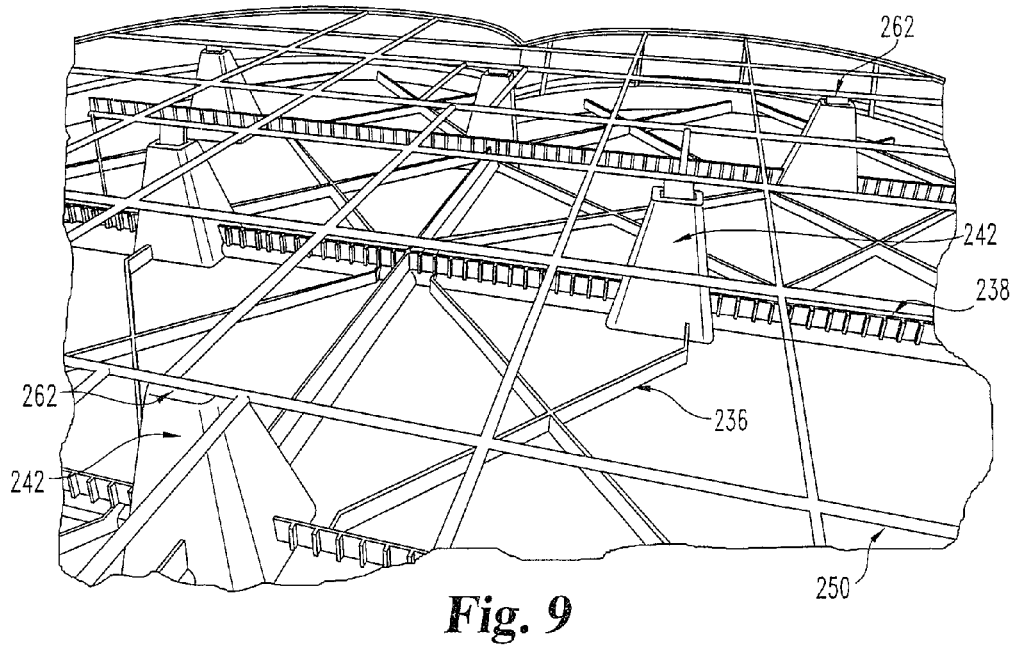
FIG. 9 is a perspective representation of a portion of the apparatus of FIG. 8.

FIGS. 7, 8, and 9 depict a floral display 220 according to another embodiment of the present invention. Floral display 220 has a closed heart shape, although it is of a relatively large size, such as the floral display 20 of FIGS. 1 and 2. FIGS. 7 and 8 show a plurality of attachment posts 242 that are integrally molded into base 230. As best seen in FIG. 7, each post has a wall that is intersected by at least one stiffening ridge 238. It can be seen that three stiffening ribs 238 extend laterally across base 230 (top to bottom as seen in FIG. 7), and further a single stiffening ridge 238 that extends from the top of the heart shape to the bottom of the heart shape (or right to left as seen in FIG. 7). Preferably, each stiffening rib 238 extends from an attachment post to the peripheral edge 234 of base 230. Floral display 220 includes six attachment posts 242 in a spaced apart array within the interior 233 of bottom 232.

In comparing FIGS. 7 and 8, it can be seen that display 220 includes a plurality of features that accommodate stacking of one base 230 on top of another base 230. Referring to FIG. 7, it can be seen that a first recess 232.1$a$ extends across the entirety of the heart shape, from a first peripheral edge 234 to an opposing peripheral edge 234. Likewise, recess 232.1$b$ extends across the entirety of the heart shape from a first portion of the peripheral edge to an opposing portion of the peripheral edge. Referring to FIG. 8, it can be seen that ridges 238$a$ and 238$b$ are adapted and configured to be received within recesses 232.1$a$ and 232.1$b$, respectively, when one base 230 is stacked upon another base 230. Further, it can be seen that the posts 242 each include a hollow volume that can receive within it a post of another base. The truncated pyramid shape of the post 242 also assists in the nesting of one base on another. Because of the pyramid shape, the base opening is smaller than the base tip, which facilitates stacking of one base on another.

FIG. 9 is a perspective view of the six attachment posts 242 of base 230. It can be seen that each attachment post can be interconnected to cage 230 by a corresponding coupling 262 that is integrally molded into cage 230. FIG. 9 also shows the plurality of stiffening ribs 236 and stiffening ridges 238 extending across the interior of bottom 232. Although what has been shown and described is a stiffening ridge 238 that has a higher cross sectional moment of inertia that the stiffening ribs 236, the present invention contemplates those embodiments in which the ridges 238 and ribs 236 are substantially the same in cross sectional properties. Further, the present invention also contemplates those embodiments in which the attachment posts are molded into the bottom 232 without any rib or ridge touching and structurally loading a wall of the attachment posts. In addition, although four sided, pyramidal shapes have been shown and described for the attachment posts, other embodiments of the present invention contemplate attachment posts that extend vertically out of bottom 232 of any shape, including rectangular, cylindrical, and other shapes.

Figure 10:
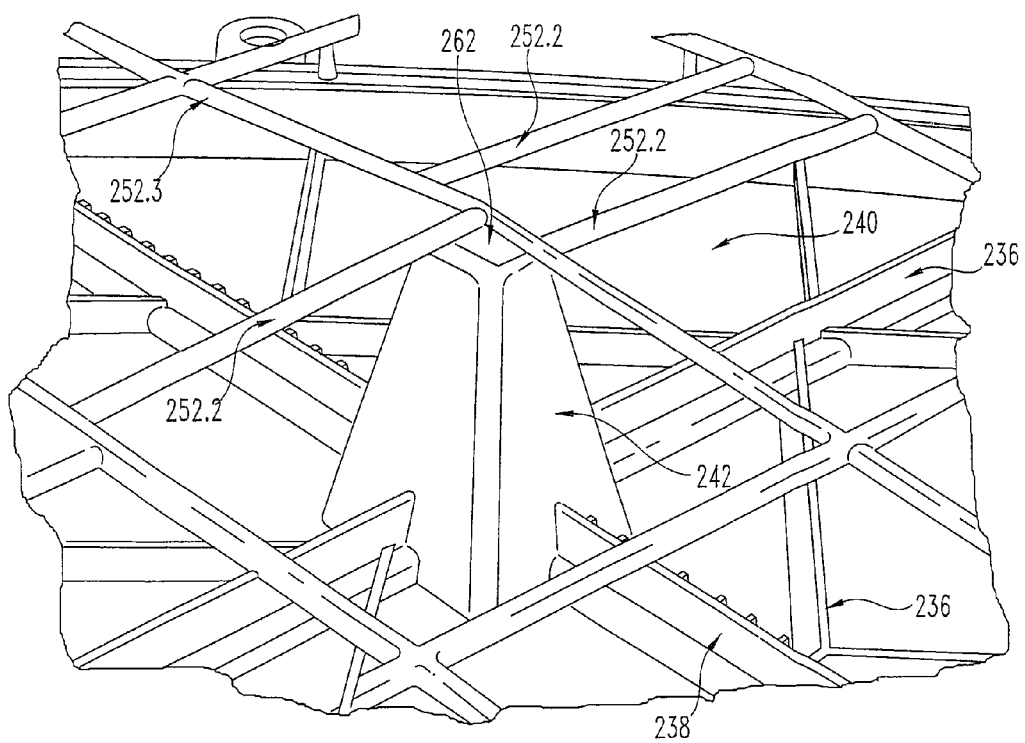
FIG. 10 is a perspective representation of the apparatus of FIG. 9 showing a cage interconnected to a post.

FIG. 10, shows male coupling 262 received within and interconnected to post 242. As shown in FIG. 10, the lattice work of cage 250 is adapted and configured to provide loads into post 242. As best seen in FIG. 10, a first lateral member 252.2 of mesh 252 intersects with a generally orthogonal lateral structural member 252.3 at the location of male coupling 262. FIG. 10 shows a pair of lateral members 252.2 that extend out of the same lateral member 252.3 in close proximity to male coupling 262.

Figure 11:
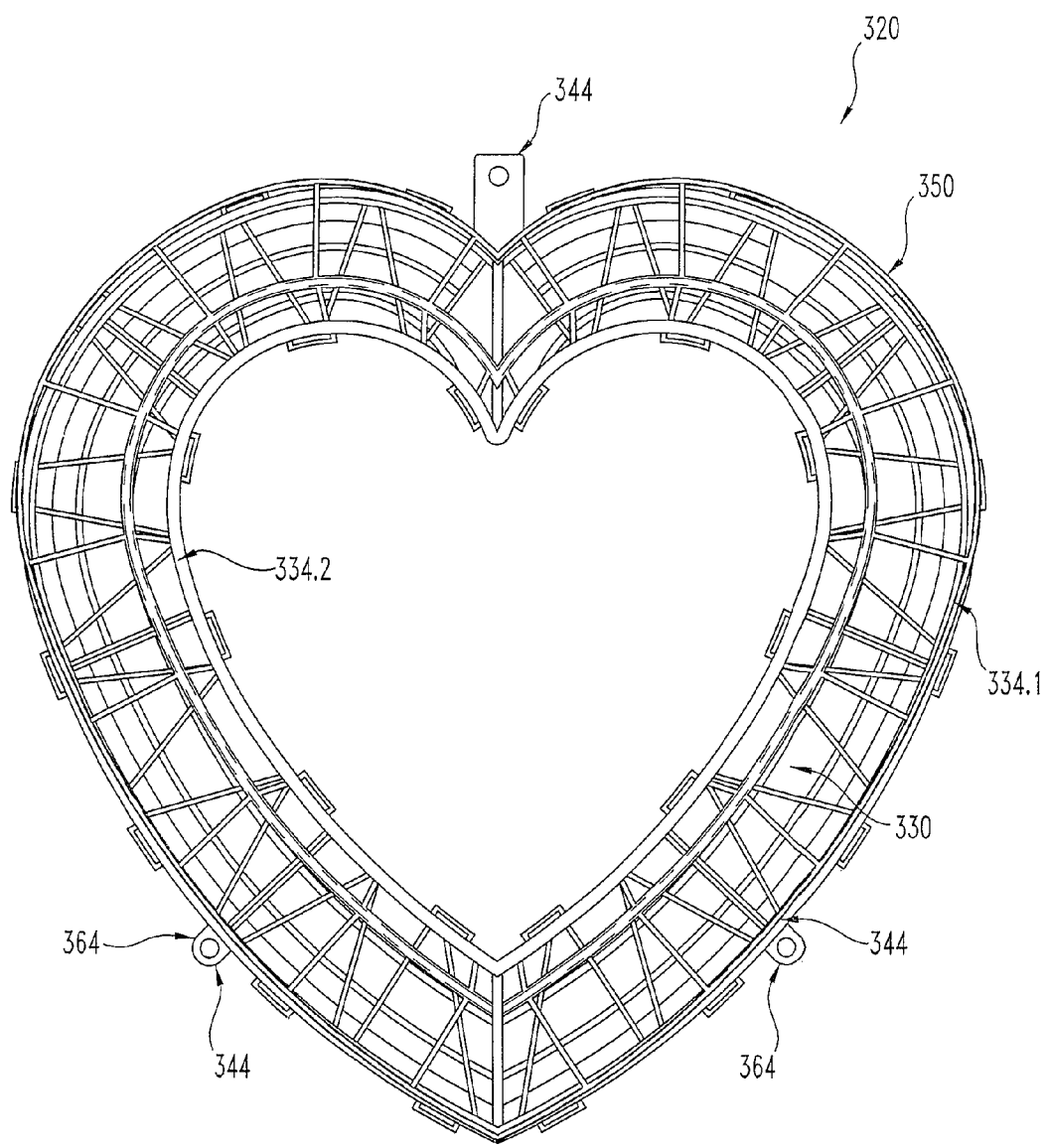
FIG. 11 is a front plan representation of a floral display according to another embodiment of the present invention.
Figure 12:
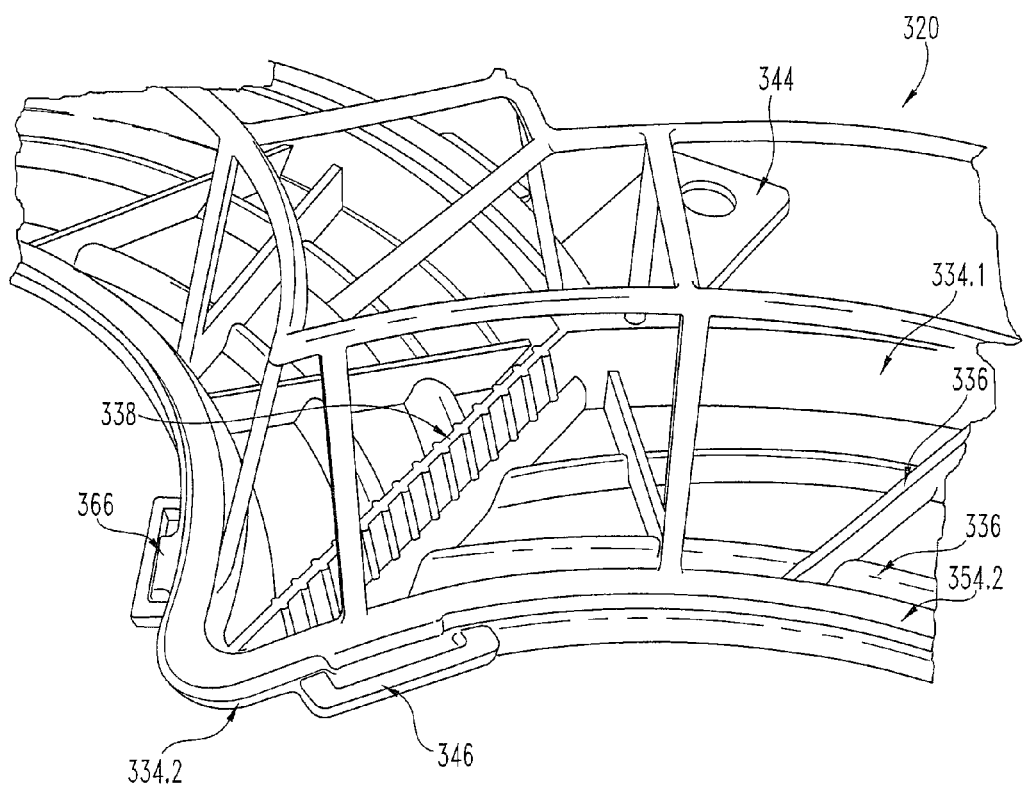
FIG. 12 is a perspective representation of a portion of the apparatus of FIG. 11.

FIGS. 11 and 12 show a floral display 320 according to another embodiment of the present invention. Display 320 is in the overall shape of an opened heart. In contrast to display 220, display 320 includes an interior that is substantially open, and preferably in the same shape as the overall shape of display 320. Therefore, base 330 is bounded both by an outer peripheral edge 334.1, as well as by an inner peripheral edge 334.2. Both edges 334.1 and 334.2 project from base 330, so as to better restrain the media 324 (not shown). A cage structure 350 of a shaped substantially similar to that of base 330 is attached to the base by a plurality of mechanically interlocking features 346 and 366. As seen in FIG. 12, interior border 354.2 includes a plurality of outwardly and downwardly extending male tabs 366 that are adapted and configured to interlock with a complementary-shaped female slot 346 that projects outwardly (i.e., toward the opened interior) of display 320.

Base 330 preferably includes a plurality of stiffening ridges 338 that extend from the inner edge to the outer edge of base 330. Further, an array of stiffening ribs 336 likewise extend from inner edge to outer edge, and also substantially parallel to the inner and outer edges. Display 320 includes a plurality of attachment tabs 344 integrally molded to the peripheral edge of the base, as well as a plurality of similarly-shaped attachment tabs 364 integrally molded into cage structure 350.

Figure 13:
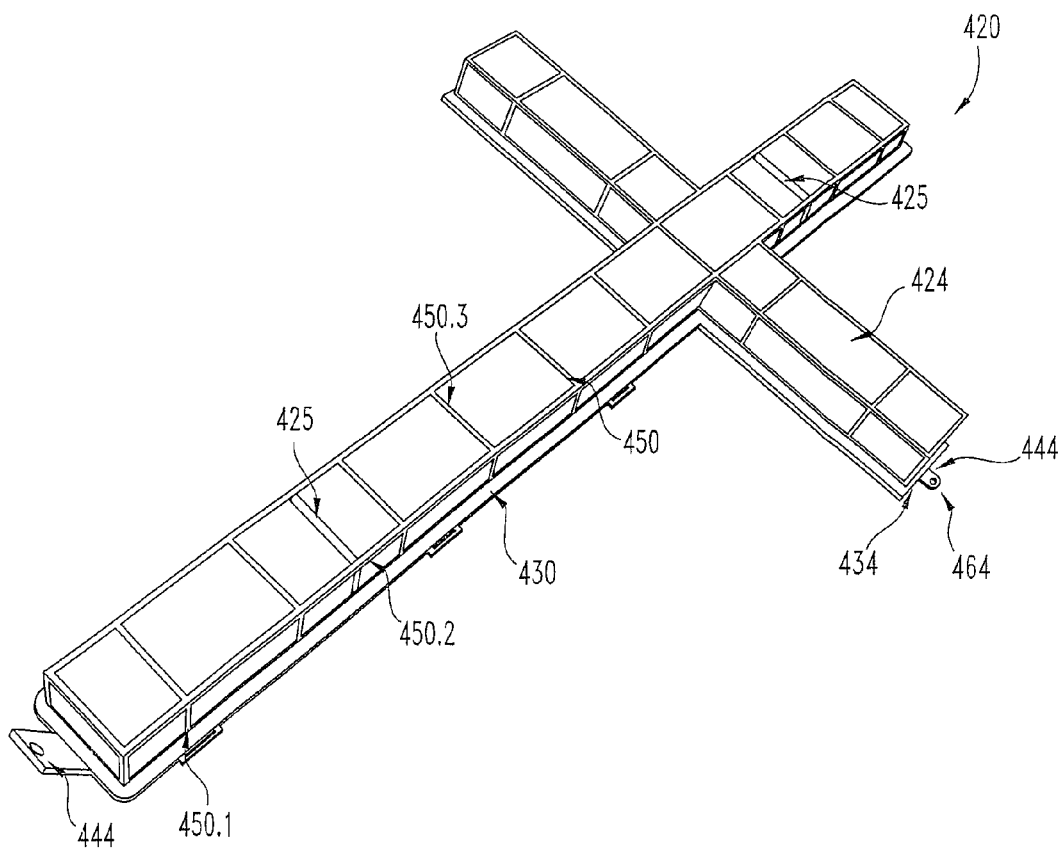
FIG. 13 is a front, bottom, left side perspective representation of a floral display according to another embodiment of the present invention.

FIGS. 13 and 14$a$ show a floral display 420 according to another embodiment of the present invention. This display 420 is in the shape of a cross. The display includes a cage structure 450 that interconnects with a base 430 to capture therebetween a quantity of water-retaining media 424. Various attachment tabs 444 extending from base 430 align with corresponding attachment tabs 464 that extend from cage 450 for joint attachment to a supporting structure. A plurality of coupling features 446 and 466 extend around the periphery of the edge 434 and border 454, respectively. As best seen in FIG. 14, the male tabs 464 are spaced along border 454 to align with corresponding slots 446 arranged along edge 434.

Referring to FIGS. 13 and 14$a$, it can be seen that the media 424 is arranged in a plurality of separate and adjacent blocks. In some embodiments, a gap 425 is placed between adjacent blocks to resist wicking of water from one block an adjacent block. The gaps 425 are preferably aligned with the stiffening ribs 436 or 438 that can be seen in FIG. 14$a$. Stiffening ribs 436 divide portions of the bottom 432 into compartments 440.

FIGS. 14$b$-14$e$ show a floral display 420' according to another embodiment of the present invention. Floral display 420' is similar to display 420, and comprises a cage structure 450' (not shown) that interconnects with base 430' to capture therebetween a quantity of water-retaining media 424' (not shown).

FIG. 14$b$ shows the bottom surface 432.3' in plan view. It can be seen that base 432' has three recesses 432.1$a'$, 432.1$b'$, and 432.1$c'$, extending across the base from a portion of the peripheral edge 434' on one side of the base to an opposite portion of peripheral edge 434' on the other side of the base.

Figure 14A:
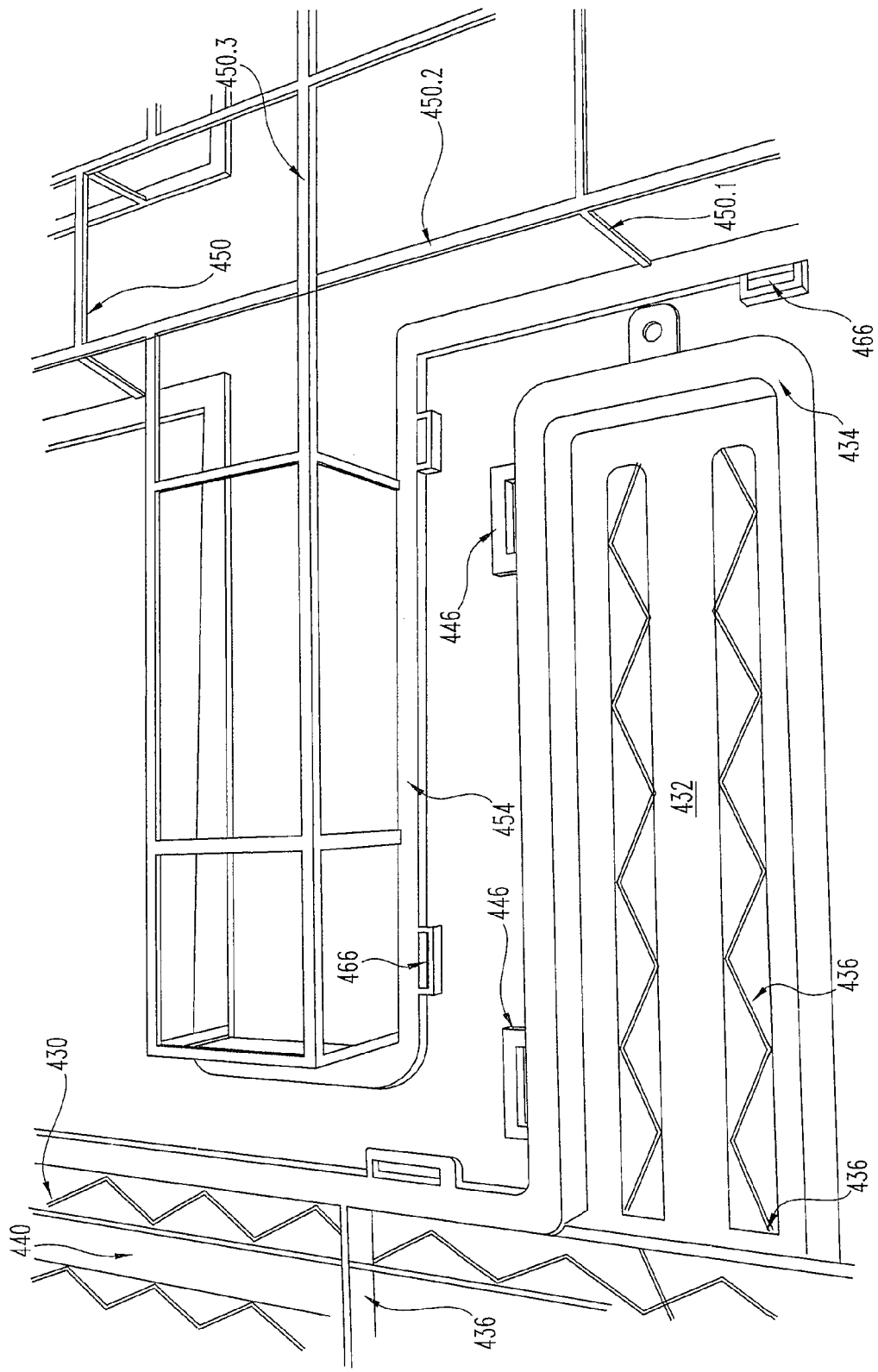
FIG. 14a is a representation of the bottom and cage of the apparatus of FIG. 13 separated and placed side by side.
Figure 14B:
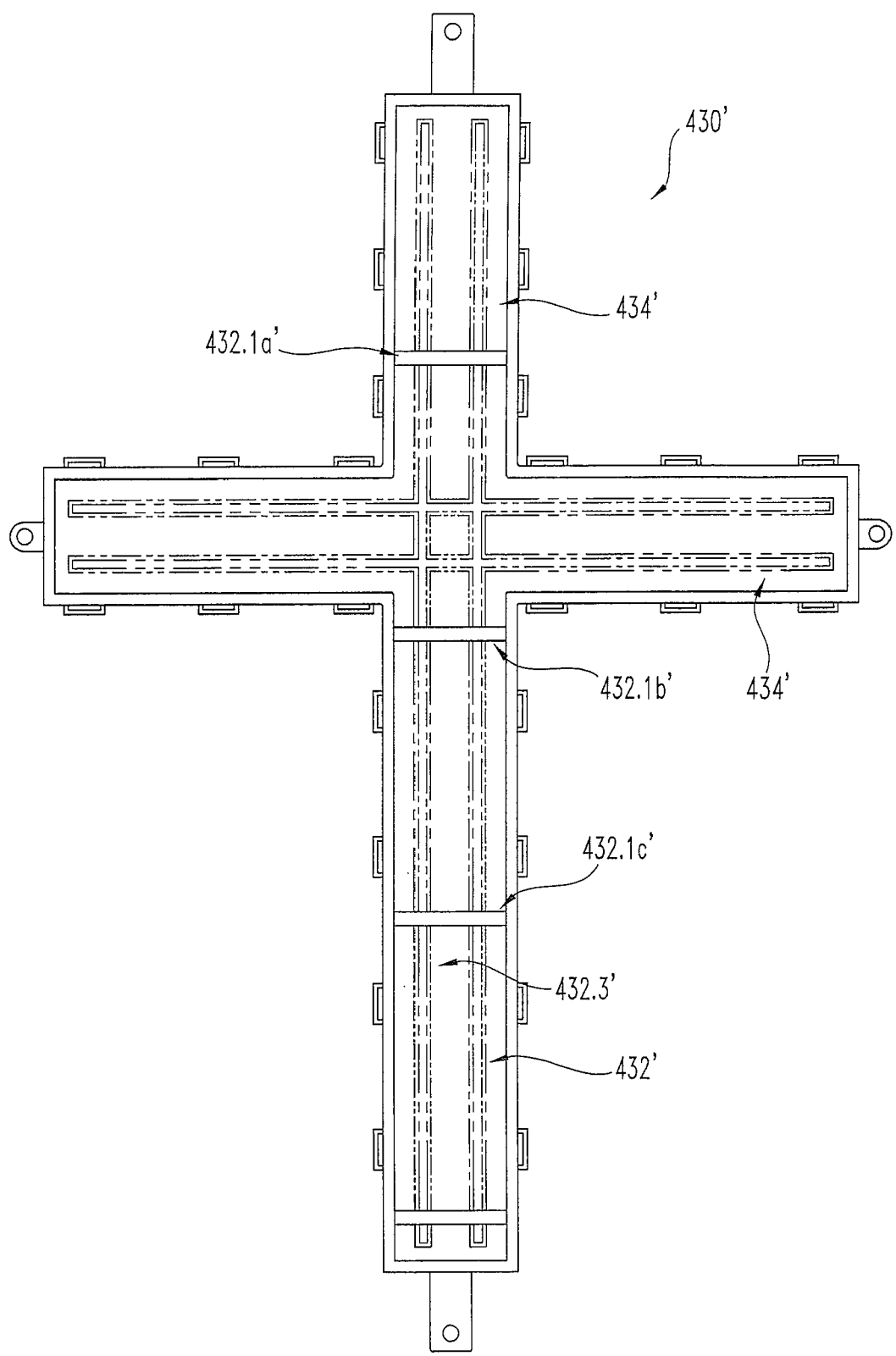
FIG. 14b is a representation of the bottom surface of a base for a floral display according to another embodiment of the present invention.
Figure 14C:
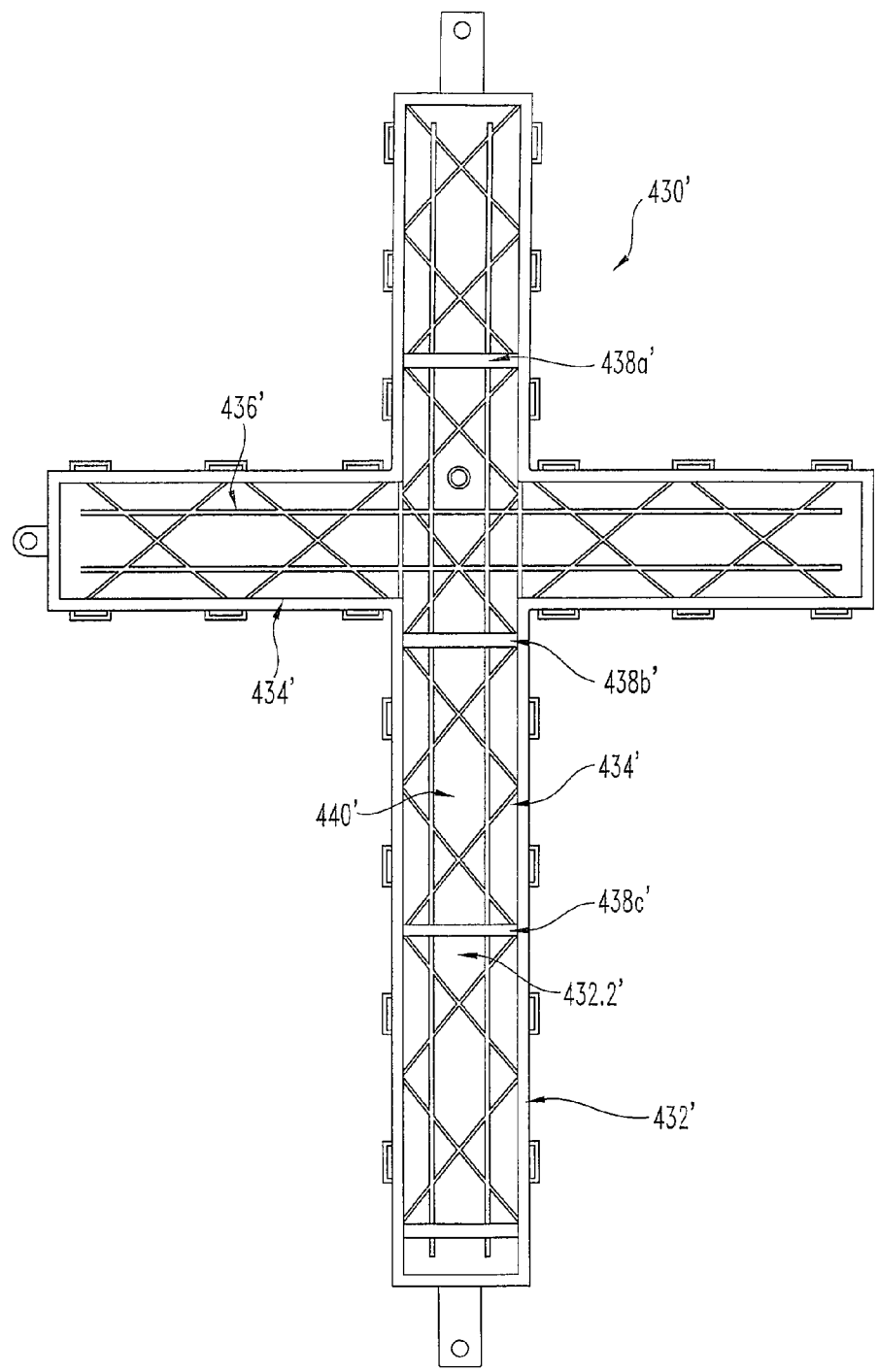
FIG. 14c is a representation of the top and interior of the apparatus of FIG. 14b.
Figure 14D:
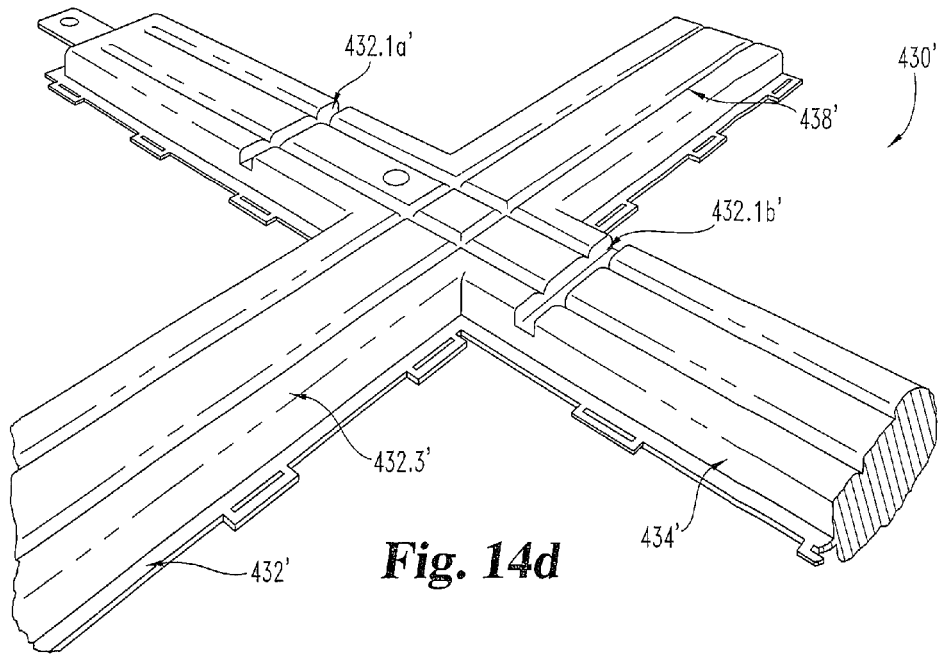
FIG. 14d is a bottom, lower, right side perspective representation of the apparatus of FIG. 14b.

FIG. 14d further shows these recesses preferably extending completely across a part of the predetermined shape of the base 432'.

Figure 14E:
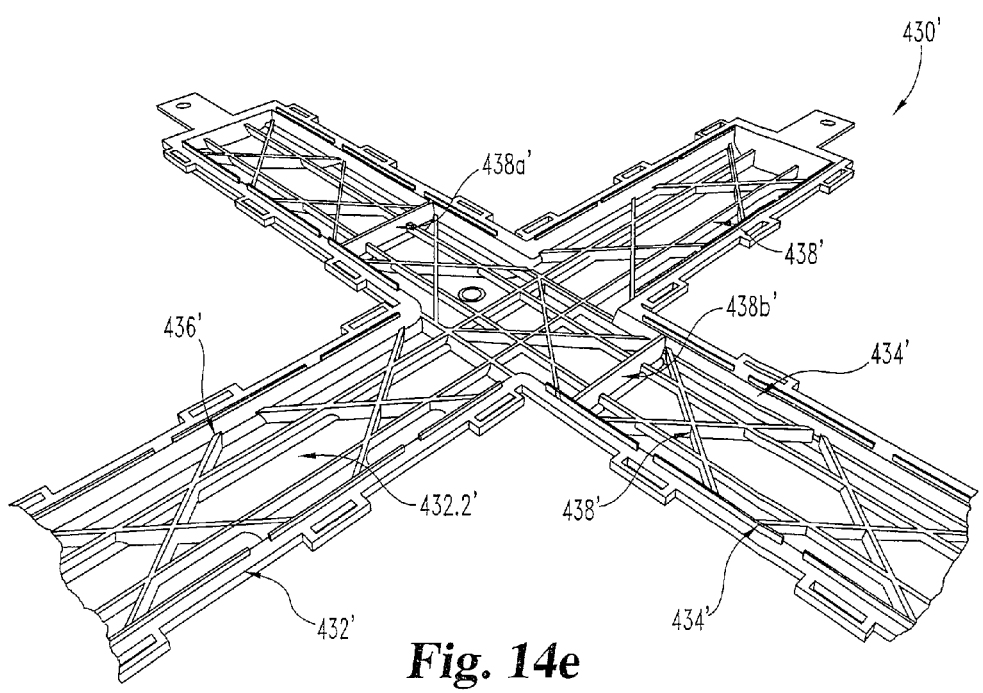
FIG. 14e is a front, left side, top representation of the apparatus of FIG. 14c.

FIGS. 14c and 14e show the opposite sides of FIGS. 14b and 14d, respectively. It can be seen that base 430' includes three ridges 438a', 438b', and 438c' that likewise extend from a portion of peripheral edge 434' across the upper surface 432.2' to a portion of the opposing peripheral edge 434'. As best seen in FIG. 14e, it can be seen that the upper surface 432.2' of bottom 432' defines a lower surface of the internal volume of base 430', with the upwardly-extending peripheral edges 434' also defining boundaries of the internal volume. In some embodiments, this internal volume is broken into discrete compartments 440' by ridges 438'. Preferably, ridges 438' have a height that is roughly the same as the height of the peripheral edge 434'. Preferably, a piece of the water-retaining media is adapted and configured to fit between adjacent ridges (such as 438a' and 438b') in compartment 440' with the bottom portion of the media being contained within the interior volume.

Base 430' is adapted and configured to nest within itself, such that a plurality of bases 430' can be stacked one on top of another. The stack is kept stable by the interface between a ridge 438' of a bottom base and the recess 432.1' of the top base. Preferably, the width of the recess 432.1' is greater than the thickness of the ridge 438'. Further, the recess 432.1' has a length that is sufficient to accommodate the length of the corresponding ridge 438. Referring to FIGS. 14d and 14e, it can be seen that the locations of recesses 432.1a' and 432.1b' correspond to the locations of ridges 438a' and 438b'.

Further, in some embodiments the cross sectional shape of the bottom and peripheral edges is adapted and configured to nest within its own cross section. Referring to FIGS. 14c and 14e, the upwardly projecting peripheral edges 434' diverge apart slightly from one another, such that the distance across the top of the peripheral edges is greater than the distance across the bottom of the peripheral edges (this bottom being visible in FIG. 14d). Since the bottom surface of the predetermined shape is slightly smaller than the top of the predetermined shape, the bases can nest one within another.

Figure 15:
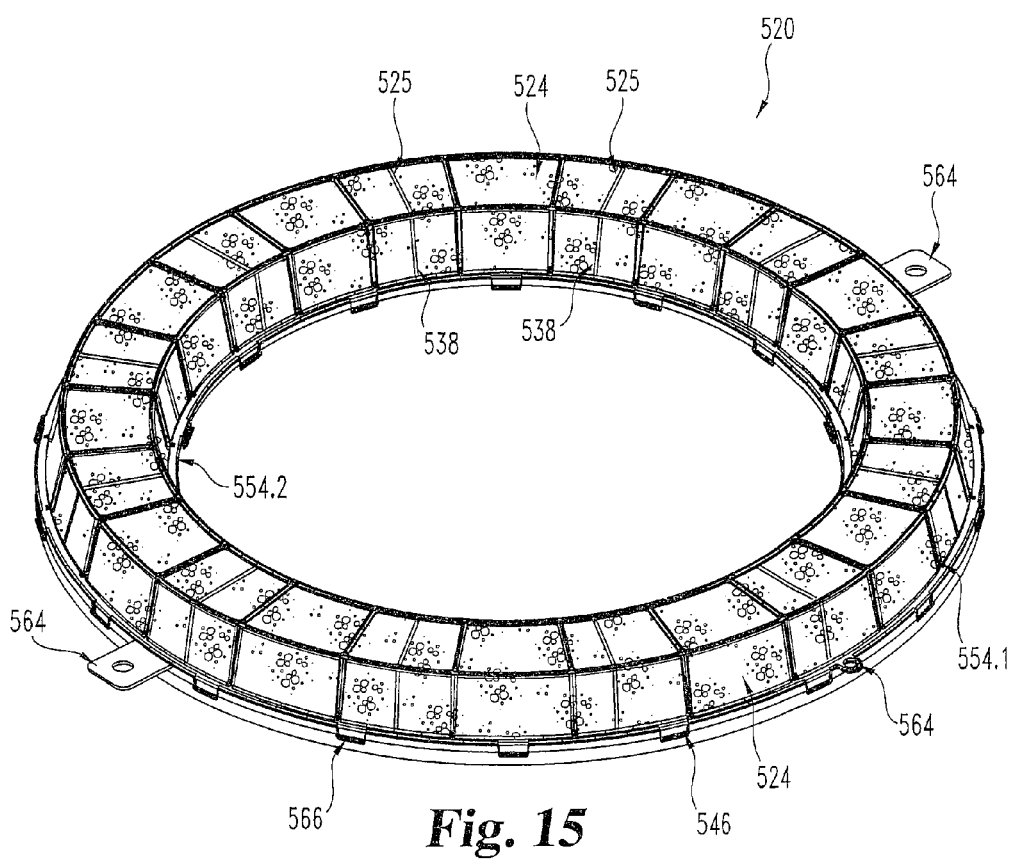
FIG. 15 is a front, bottom, left side perspective drawing of a floral display according to another embodiment of the present invention.
Figure 16:
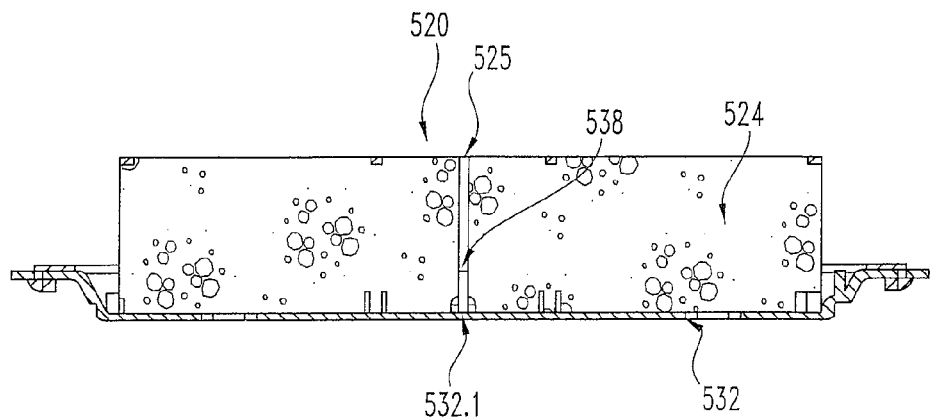
FIG. 16 is a cross sectional view of a portion of the apparatus of FIG. 15.
Figure 17:
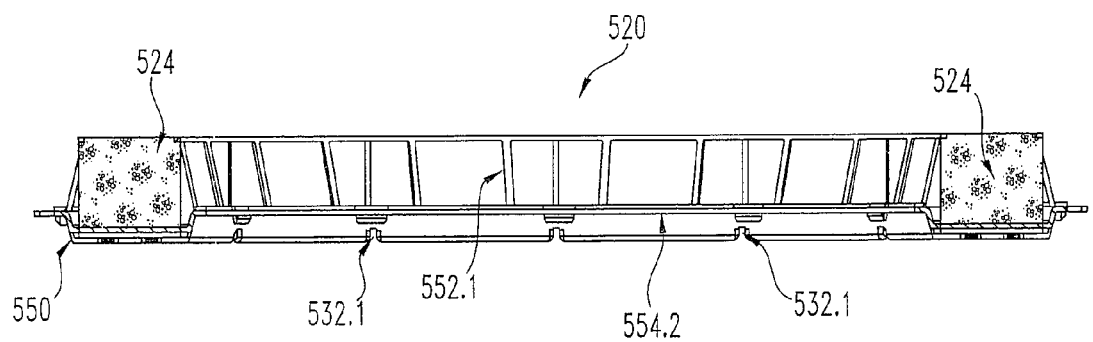
FIG. 17 is a cross sectional view of the apparatus of FIG. 15 as taken through the centerline of the apparatus.

FIGS. 15, 16, and 17 show a floral display 520 according to another embodiment of the present invention. Display 520 is arranged in the shape of a wreath or hoop. The wreath shape is substantially open, and is bounded by inner and outer borders 554.2 and 554.1, respectively, of cage structure 550. It is understood that other embodiments of the present invention include wreaths having a closed shape. Attachment tabs 544 and/or 564 extend from locations around the outer peripheral edge, although other embodiments of the present invention contemplate attachment tabs extending from the inner border or the inner peripheral edge. A plurality of attachment tabs extend around both the inner and outer borders and edges, similar to other tabs described herein. Separable pieces of water-retaining media 524 are located in compartments 540 between adjacent ridge 538, as shown on FIG. 15. Base 530 includes a plurality of recesses 532.1 that are adapted and configured to receive within them corresponding ridge 538 of another stacked base 530.

While the inventions have been illustrated and described in detail in the drawings and foregoing description, the same is to be considered as illustrative and not restrictive in character, it being understood that only certain embodiments have been shown and described and that all changes and modifications that come within the spirit of the invention are desired to be protected.

What is claimed is:

1. An apparatus for displaying flowers, comprising:
a base having a bottom and a peripheral edge in a predetermined shape, the edge defining an interior, the edge including a plurality of first interlocking features, said base including a post extending upward from the bottom and being located within the interior;
a cage having a border in a shape similar to the predetermined shape, the border including a plurality of second interlocking features, wherein each of said first interlocking features is adapted and configured to interlock with a corresponding different one of said second interlocking features, said cage including a coupling feature for interconnecting with the post; and
solid media capable of retaining water and having a shape similar to the predetermined shape, said media being captured between said base and said cage when the edge and border are interlocked together.

2. The apparatus of claim 1 wherein post includes a female coupling feature and the coupling feature of said cage is male.

3. The apparatus of claim 1 wherein said base includes a ridge extending across the bottom from opposing edges, the ridge being adapted and configured to stiffen said base proximate to the post.

4. The apparatus of claim 1 wherein said base is a unitary molded article, the bottom including a ridge extending from the post to opposing edges.

5. The apparatus of claim 1 wherein the shape is that of a closed heart, a closed star, or a closed wreath.

6. The apparatus of claim 1 wherein said post is substantially hollow, and said post has a shape adapted and configured such that the hollow interior of the post of one said base can nest within it a corresponding post of another said base.

7. The apparatus of claim 1 wherein said first tab defines a first hole, said second tab defines a second hole, and said first hole and said second hole align to received a common fastener when said base and said cage are interlocked.

8. The apparatus of claim 1 wherein said media comprises a plurality of individual pieces.

9. The apparatus of claim 1 wherein said cage comprises a plurality of support beams interconnected in a three dimensional pattern.

10. The apparatus of claim 1 wherein the border is substantially continuous in the shape and interconnected among the plurality of second interlocking features.

11. The apparatus of claim 1 wherein said first interlocking features are female slots at spaced apart locations along the edge and said second interlocking features are male tabs at spaced apart locations along the border, the locations of the slots corresponding to the locations of the tabs to permit interlocking therebetween.

12. The apparatus of claim 1 wherein said base includes a first attachment tab defining a first hole for a fastener, said cage includes a second attachment tab defining a second hole for a fastener, said first tab extending outwardly from the edge and said second tab extending outwardly from the border, the first hole and the second hole being substantially aligned to accept the same fastener when said base and said cage are interlocked.

13. An apparatus for displaying flowers, comprising:
a base having a bottom and a peripheral edge in a predetermined shape, the edge including a plurality of first interlocking features, a first attachment tab extending outwardly from the edge;
a cage having a border in a shape similar to the predetermined shape, the border including a plurality of second interlocking features, wherein each of said first interlocking features is adapted and configured to interlock with a corresponding different one of said second interlocking features, a second attachment tab extending outwardly from the border; and solid media capable of retaining water and having a shape similar to the predetermined shape, said media being captured between said base and said cage when the edge and border are interlocked together, said first tab and said second tab substantially overlapping each other when the edge and border are interlocked together, said first tab and said second tab being adapted and configured to support the weight of the interlocked said base and said cage when said media is captured and saturated with water.

14. The apparatus of claim 13 wherein said first tab defines a first hole, said second tab defines a second hole, and said first hole and said second hole align to received a common fastener when said base and said cage are interlocked.

15. The apparatus of claim 13 wherein said media comprises a plurality of individual pieces.

16. The apparatus of claim 13 wherein the border is substantially continuous in the shape and interconnected between adjacent ones of the slots or tabs.

17. The apparatus of claim 13 wherein said cage comprises a plurality of support beams interconnected in a three dimensional pattern.

18. The apparatus of claim 13 wherein said first interlocking features are one of male tabs or female slots at spaced apart locations along the edge and said second interlocking features are the other of male tabs or female slots at spaced apart locations along the border, the locations of the slots corresponding to the locations of the tabs to permit interlocking therebetween.

19. The apparatus of claim 13 wherein said base includes one of a post or coupling feature integral with the bottom and spaced apart from the edge, said cage including the other of a post or coupling feature integral with said cage, the post and the coupling feature being interconnectable.

20. The apparatus of claim 13 wherein the shape is that of a closed heart, a closed star, or a closed wreath.

21. An apparatus for displaying flowers, comprising:
a plurality of separable pieces of solid media capable of retaining water;
a base having a bottom with an upper surface and a lower surface, said base including an upwardly extending peripheral edge substantially surrounding the upper surface, said base being in a predetermined shape, the upper surface and the edge defining an interior volume, said base including at least one ridge extending from a first portion of the edge across the upper surface to a second portion of the edge, said base including at least one recess extending from the first portion of the edge across the lower surface to the second portion of the edge; and
means for retaining the media on said base;
wherein said pieces are located in the interior volume and into the predetermined shape of said base, and said recess and said ridge are adapted and configured such that the a recess of one said base can be nested within a corresponding ridge of another said base when the one said base is aligned over and placed on top of the other said base.

22. The apparatus of claim 21 wherein said base includes a post extending upward from the upper surface bottom, said base defines a pocket within said post, and said post and said pocket are adapted and configured such that the a pocket of one said base can be nested within a corresponding post of another said base.

23. The apparatus of claim 21 which further comprises a plurality of said ridges and a plurality of said recesses, and said recesses and said ridges are adapted and configured such that the a recess of one said base can be nested within a corresponding ridge of another said base.

24. The apparatus of claim 21 wherein said media retaining means is a three dimensional cage structure.

25. The apparatus of claim 21 wherein said media retaining means includes a plurality of two dimensional struts.

26. The apparatus of claim 21 wherein said base includes a plurality of first interlocking features spaced apart from one another and proximate to the peripheral edge, said retaining media includes a border in a shape similar to the predetermined shape, the border including a plurality of second interlocking features, wherein each of said first interlocking features is adapted and configured to interlock with a corresponding different one of said second interlocking features.

27. The apparatus of claim 21 wherein said media retaining means substantially encompasses said plurality of separable pieces.

\* \* \* \* \*